US007016293B2

(12) United States Patent
Lee

(10) Patent No.: US 7,016,293 B2
(45) Date of Patent: Mar. 21, 2006

(54) METHOD OF OVERWRITING DATA IN A MULTI-SESSION DISK

(75) Inventor: Myung Kuk Lee, Kynggi-do (KR)

(73) Assignee: LG Electronics Inc., Seoul (KR)

( * ) Notice: Subject to any disclaimer, the term of this patent is extended or adjusted under 35 U.S.C. 154(b) by 792 days.

(21) Appl. No.: 10/060,344

(22) Filed: Feb. 1, 2002

(65) Prior Publication Data

US 2002/0105862 A1    Aug. 8, 2002

(30) Foreign Application Priority Data

Feb. 6, 2001 (KR) .................................. 2001-5733

(51) Int. Cl.
*G11B 7/24* (2006.01)
(52) U.S. Cl. ................................ 369/275.3; 369/59.25; 369/53.21
(58) Field of Classification Search ............ 369/275.3, 369/275.4, 288, 47.54, 47.23, 47.53, 53.21, 369/44.26, 47.24, 59.25, 277, 124.08, 53.2, 369/53.18
See application file for complete search history.

(56) References Cited

U.S. PATENT DOCUMENTS 6,671,249 B1 * 12/2003 Horie ...................... 369/275.3

* cited by examiner

*Primary Examiner*—Ali Neyzari
(74) *Attorney, Agent, or Firm*—Birch, Stewart, Kolasch & Birch, LLP

(57) ABSTRACT

The present invention relates to a method of selectively overwriting data written in a multi-session disk. To selectively overwrite a session or sessions in a multi-session disk, this method checks the size of new data requested to be written, searches the multi-session disk for a single or a plurality of consecutive sessions whose total size is larger than the size of the new data, overwrites the single or the plurality of consecutive sessions discovered in the searching step with the new data, and updates temporary management information for tracks recorded in the multi-session disk to reflect the overwritten session or sessions in the temporary management information. Accordingly, one or more sessions having useless data can be selectively overwritten without affecting other sessions having important data, and storage efficiency of a rewritable disk can be improved. Furthermore, because track information in PMA exactly reflects real recorded tracks after the session selective overwriting, a location error never occurs when appending or reproducing data.

24 Claims, 5 Drawing Sheets

METHOD OF OVERWRITING DATA IN A MULTI-SESSION DISK

BACKGROUND OF THE INVENTION

1. Field of the Invention

The present invention relates to a method of overwriting data sessions selectively in a multi-session disk.

2. Description of the Related Art

In these days, a rewritable disk such as CD-R and CD-RW as well as a read-only disk such as CD (Compact Disk) is widely used as a storage means of digital data.

Data written in a CD-R or a CD-RW is grouped by a logical track unit (abbreviated 'track' hereinafter) which is a data section recorded at a time, and a CD-R or a CD-RW has at least one session which includes at least one track where a session is defined by a user. A CD-R or CD-RW including a plurality of sessions is called 'multi-session' disk.

Each session of a multi-session disk is defined at each 'session close' request from a user, and therefore the size of each session may be different from each other. For such a multi-session disk, new data should be written as a new session next to the last closed session or as a new track of an unclosed last session.

Therefore, it is not possible to overwrite a useless session including unnecessary data if it is located between neighboring sessions. This restriction reduces disk storage efficiency. To use the space of useless sessions, disk should be erased entirely or area from the first useless session to the last session should be deleted first before recording new data. However, this method is impossible to conduct when a session including valid data exists between the first useless session and the last session.

SUMMARY OF THE INVENTION

It is an object of the present invention to provide a method of overwriting data written in a multi-session disk which can overwrite at least one session selected based on the size of new data to record.

A method of overwriting data in a multi-session disk according to the present invention checks the size of new data requested to be written, searches the multi-session disk for a single or a plurality of consecutive sessions whose total size is larger than the size of the new data, overwrites the single or the plurality of consecutive sessions discovered in the searching step with the new data, and updates temporary management information for tracks recorded in the multi-session disk to reflect the overwritten session or sessions in the temporary management information.

The present invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFFERRED EMBODIMENT

In order that the invention may be fully understood, a preferred embodiment thereof will now be described with reference to the accompanying drawings.

Figure 1:
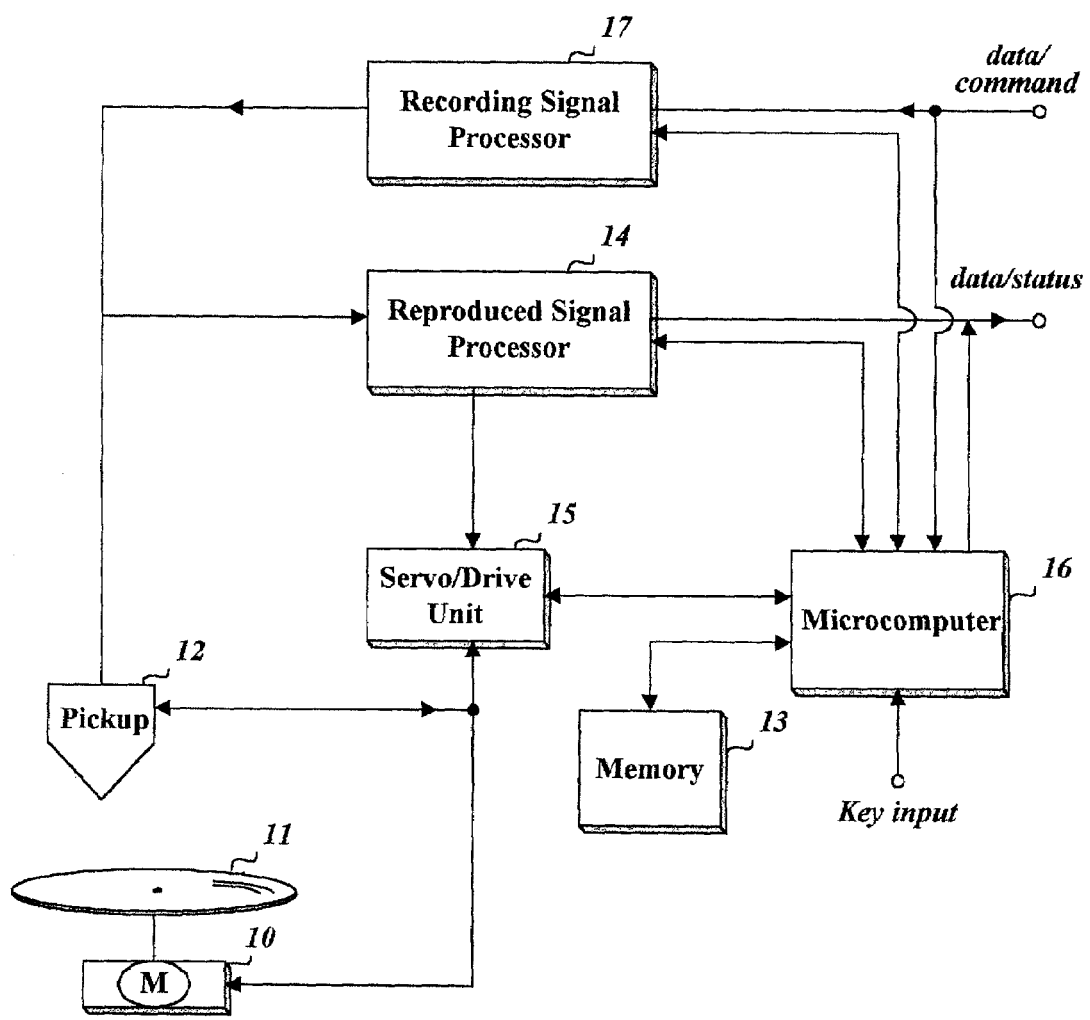
FIG. 1 is a simplified block diagram of a disk drive to which a data overwriting method according to the present invention is applicable.

FIG. 1 is a simplified block diagram of a disk drive to which a data overwriting method according to the present invention is applicable. The disk drive of FIG. 1 comprises an optical pickup 12 for writing/reading data to/from a rewritable disk 11, for example, a CD-R/W; a reproduced signal processor 14 for processing the read signals by the optical pickup 12 to restore original digital data; a recording signal processor 17 for converting received signals from an external device, e.g., a host to writing signals suitable for the disk 11; a servo/drive unit 15 for conducting servo operation for record or reproduction of the rewritable disk 11; a microcomputer 16 for supervising all elements to conduct record or reproduction; and a memory 13 for storing temporary data produced while reproducing or recording. Also shown is a motor 10 for rotating the disk 11.

In the disk drive configured as FIG. 1, if new data is requested to be overwritten from a user after the multi-session disk 11 is placed in the disk drive, the size of the new data is examined and a search operation is conducted to find a session whose size is larger than the size of the new data. If such a session is found, that session is overwritten with the new data and the recorded new data is grouped into a track. Due to the overwriting operation, previous management information including position information on the overwritten tracks and next tracks may be incorrect for the recorded tracks, thus the management information is changed appropriately.

The above operations explained briefly are described below in detail.

Figure 2:
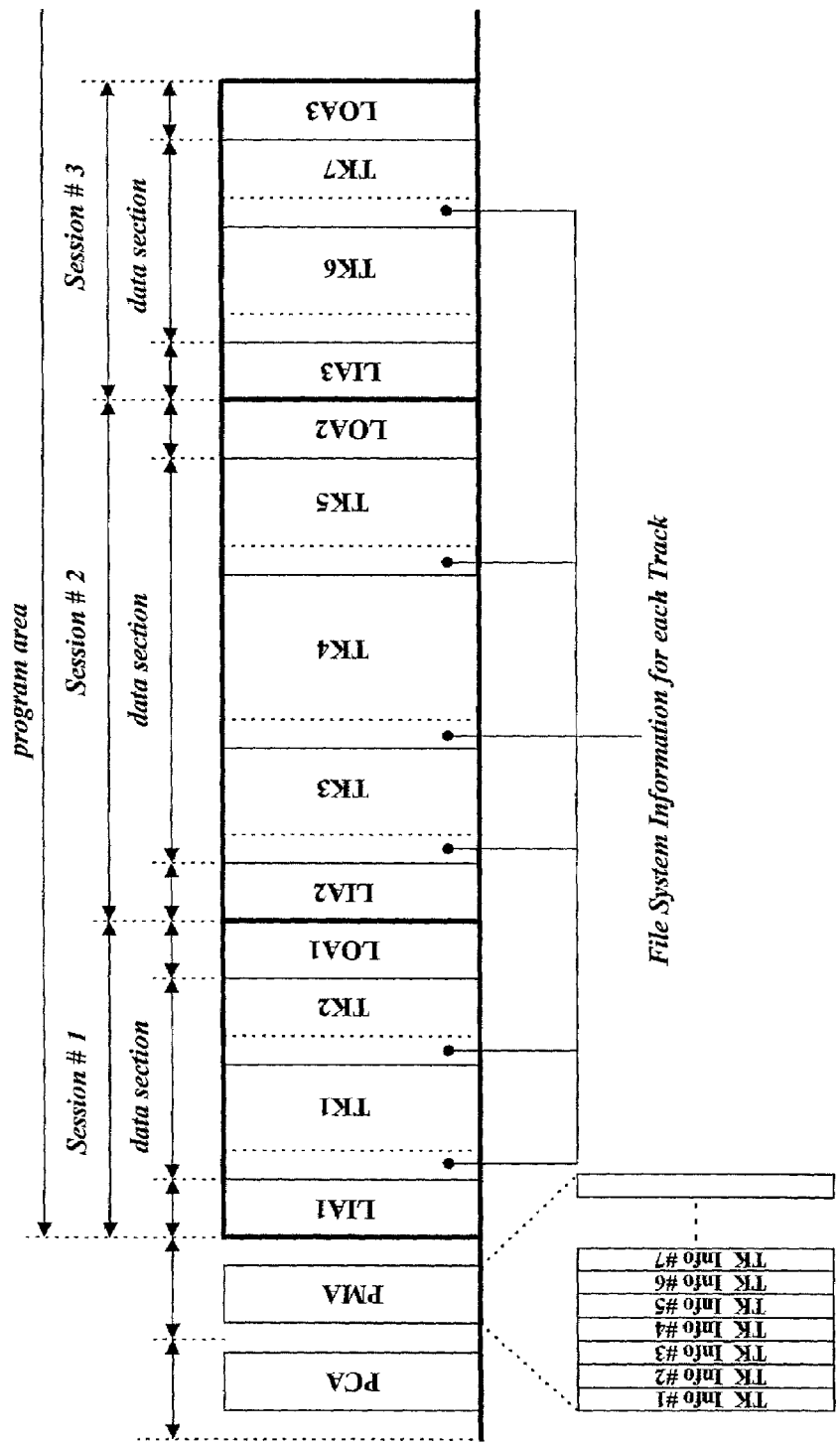
FIG. 2 is an illustrative format example of data recorded in a multi-session disk.

FIG. 2 is an illustrative format example of data recorded in the multi-session disk 11. In the example of FIG. 2, the multi-session disk 11 has three sessions where the tracks 1 and 2 are included in the first session, the tracks 3 to 5 are included in the second, and the tracks 6 and 7 are included in the third. A lead-in 'LIA' and a lead-out 'LOA' area are allocated at the head and the tail of each session, respectively.

In addition, as shown in FIG. 2, the rewritable disk 11 also has a PCA (Power Calibration Area) and a PMA (Program Memory Area) from most inner side besides a program area where user data is to be written.

The PCA is prepared for testing a writing power to obtain an optimal writing power of a laser diode equipped in the optical pickup 12, and the PMA is for temporary management information, marked 'TK_Info #1 ~#7' in FIG. 2, for each track. The temporary management information consists of a track index number, start and end position expressed in time, etc. When some tracks are grouped into a session by a session closing operation the temporary management information written in PMA for those tracks are copied onto a lead-in area of the closed session. File system information about files included in a recorded track is written at the head of each track as shown in FIG. 2.

Figure 3:
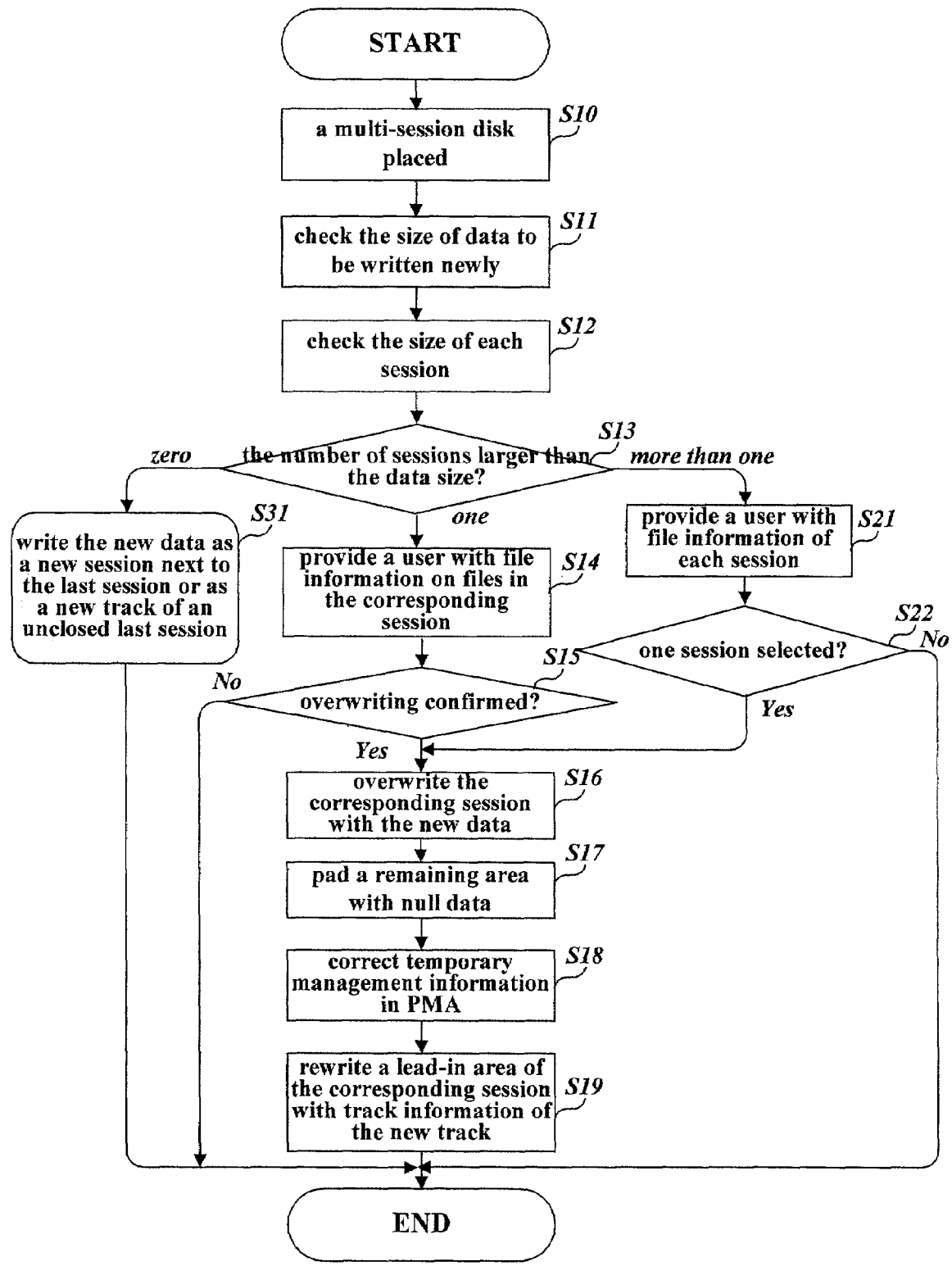
FIG. 3 is a flow chart of an embodiment of a multi-session disk overwriting method according to the present invention.

FIG. 3 is a flow chart of an embodiment of a multi-session disk overwriting method according to the present invention. The flow chart depicted in FIG. 3 is described below in detail.

After the rewritable multi-session disk 11 having data recorded as given in FIG. 2 is placed in the disk drive of FIG. 1 (S10), if a user requests the disk 11 to be overwritten with new data the microcomputer 16 checks the size of the new data as interpreting a write command (S11) from an external host.

Then, the microcomputer 16 examines the size of each session to choose one session whose size is larger than that of the new data (S12). To examine the size of each session, the microcomputer 16 reads the file system information at the head of each session through controlling the servo/drive unit 15, first. The read signals by the pickup 12 are converted to digital data by the reproduced signal processor 14 and then stored in the memory 13. The microcomputer 16 adds up each size of files belonging to one same session through examination of the stored file system information in the memory 13. Through this process, every size of recorded sessions becomes known.

Another calculating method of the size of each session uses start and end position information of each track belonging to a same session. Adding each length between start and end position of each track will result in the size of each session.

If at least one session is larger than the size of the new data (S13), for example, if the size of the second session including tracks 3 to 5 is larger than the size of the new data in the example of FIG. 2, the microcomputer 16 reads all file system information at each head of tracks 3 to 5 and provides the file information for an external host (S14). The reason the file information is provided is to receive confirmation on whether the second session to be overwritten is not useful any more.

Figure 4:
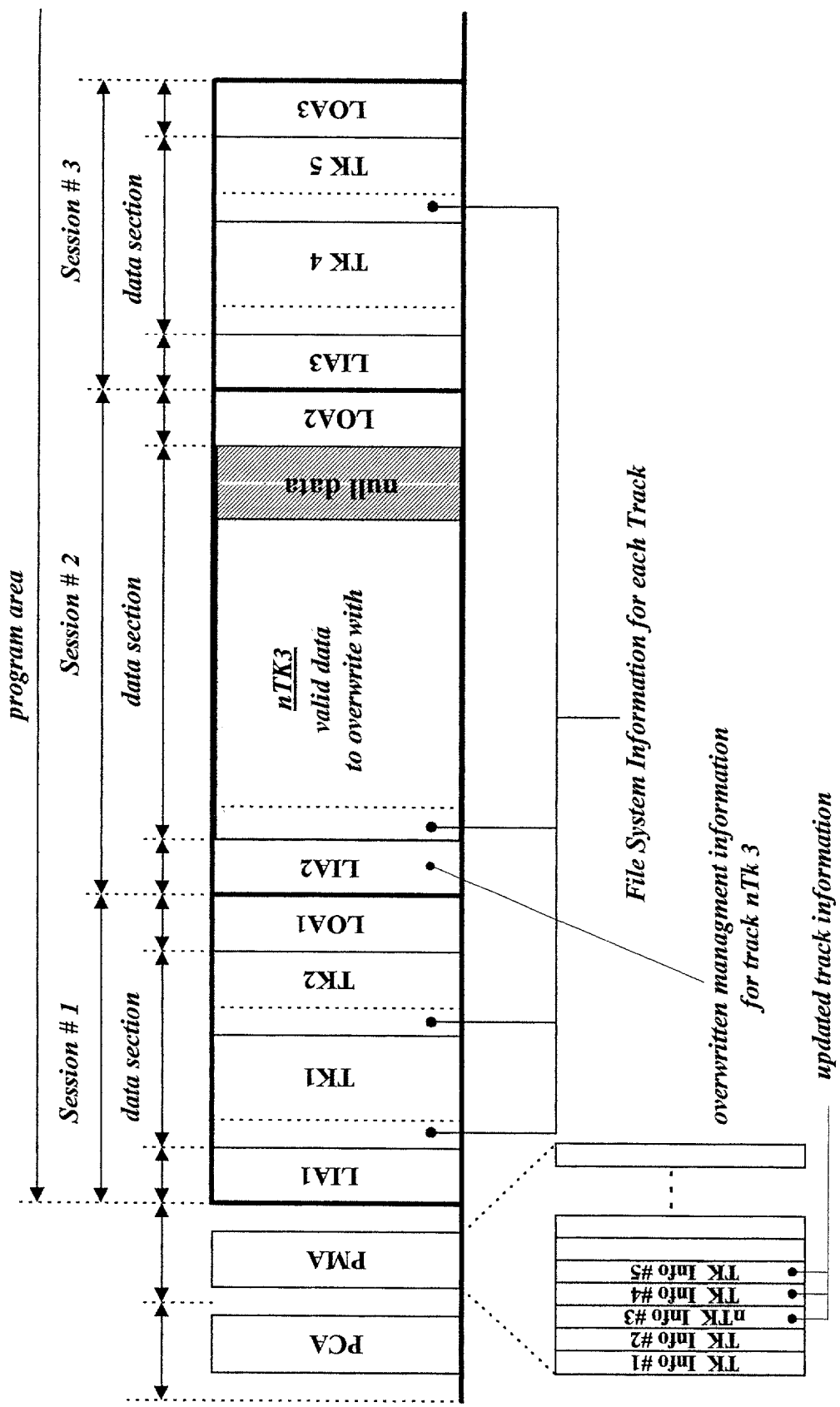
FIG. 4 is an illustrative overwriting example in which one session in a multi-session disk has been overwritten according to the present invention.

If a user still requests to overwrite with the new data (S15) at this confirming step, the microcomputer 16 overwrites the second session as a single track 'nTK3' with the pulse-formatted new data by the recording signal processor 17 as shown in FIG. 4 (S16). However, because the original size of the second session is larger than the size of the new data, a remaining section arises in the second session. Non-overwritten data in the remaining section right after the new track 'nTK3' may cause a CRC error in reproduction, thus, the remaining section is preferably padded with null data (S17).

In addition, because three tracks 3 to 5 are changed to one track 'nTK3' due to the overwriting operation, old track information 'TK_Info #1~#7' written in PMA is different from real recorded tracks, therefore, the old track information 'TK_Info #3~#5' for the overwritten tracks 3 to 5 should be replaced with a new track information 'nTK_Info #3' for the new track 'nTK3' to correct the temporary management information in PMA (S18).

For PMA correcting operation, the microcomputer 16 reads track information 'TK_Info #6, #7' associated with the tracks 6 and 7 included in the third session following the overwritten second session, overwrites the location reserved for the third track management information with track information 'nTK_Info #3' about the new track 'nTK3', and overwrites the locations reserved for the fourth and the fifth track management information with the read track information 'TK_Info #6, #7' after modifying the track index numbers 6 an 7 written in the read track information 'TK_Info #6, #7' to 4 and 5, respectively.

And, because the overwritten session has been already closed, the lead-in information of the overwritten session is also updated with the information about the new track 'nTK3' (S19).

FIG. 4 shows a changed recording diagram after user data in the program area and all management information in PMA are updated according to the above-explained operations. As shown in FIG. 4, it is possible to selectively overwrite an arbitrary session with a single track containing new data in a multi-session disk.

If there are two or more sessions each of which has larger size than the new data (S13), the microcomputer 16 provides respective file information about all files included in the sessions for the external host (S21) in order that a user might choose one among the sessions.

When a user chooses one session which has useless files (S22) the microcomputer 16 conducts the above-explained overwriting operations (S16~S19). If there is no session whose size is larger than that of the new data, the microcomputer 16 writes the new data as a new session next to the last session or as a new track of an unclosed last session the same as conventional methods do (S31).

Figure 5:
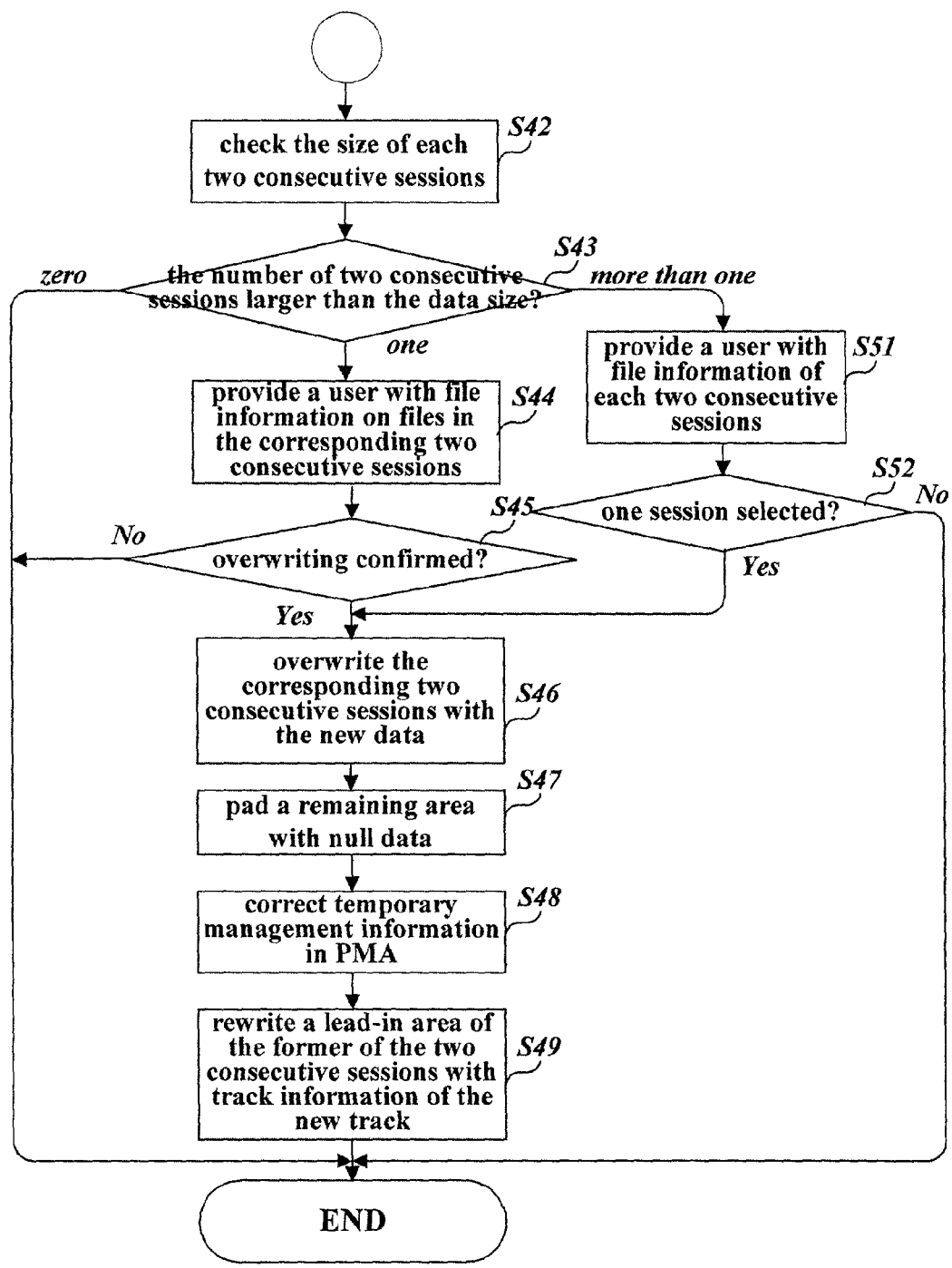
FIG. 5 is a flow chart of another embodiment of the present invention which two consecutive sessions are used for being overwritten with new data.

Instead of writing new data after the last track, two or more consecutive sessions may be overwritten at a time with the new data if a total size of those sessions is larger than the new data. FIG. 5 depicts a flow chart according to this embodiment where two consecutive sessions are searched for being overwritten.

If there is no single session whose size is larger than that of the new data to overwrite with, the microcomputer 16 searches for two consecutive sessions whose total size is larger than that of the new data (S42,S43). If the number of two consecutive sessions is one the microcomputer 16 provides file information about files included in the two consecutive sessions for a user (S44). After that, if a user still wants data overwriting (S45) the microcomputer 16 overwrites the two sessions with the new data (S46). Due to this overwriting operation, two consecutive sessions are made to one session. The remaining area of the two sessions not overwritten with the new data is filled with null data, too (S47).

Because all tracks included in the two consecutive sessions become one track, the track information in PMA is amended as explained above (S48). Lastly, management information in a lead-in area of the former session of the two is updated with the information about the newly recorded track (S49).

If the number of two consecutive sessions is greater than one at the steps S42 and S43 the microcomputer 16 provides file information about files included in each two consecutive sessions for a user (S51) in order that a user might select one among a plurality of two consecutive sessions (S52). If two consecutive sessions are selected the above-explained overwriting operations (S46~S49) are conducted to overwrite the selected two sessions with new data.

Instead of two consecutive sessions, three or more consecutive sessions can be used to overwrite with new data in the embodiment of FIG. 5.

The method of overwriting data in a multi-session disk according to the present invention can overwrite selectively one or more sessions having useless data without affecting other sessions having important data, thereby improving storage efficiency of a rewritable disk. Furthermore, because track information in PMA exactly reflects real recorded tracks after the session selective overwriting, a location error never occurs when appending or reproducing data.

What is claimed is:

1. A method of overwriting data in a multi-session disk, comprising:
   (a) checking the size of new data requested to be written;
   (b) searching the multi-session disk for a session whose size is larger than the size of the new data;
   (c) overwriting the session discovered in said step (b) with the new data; and
   (d) updating temporary management information for tracks recorded in the multi-session disk to reflect the overwritten session in the temporary management information,
   wherein said step (c) pads a remaining area not overwritten in the session with null data.

2. The method set forth in claim 1, wherein said step (b) adds up each size of tracks included in a session, and selects the session if the added-up size is larger than the size of the new data.

3. The method set forth in claim 1, wherein said step (b) adds up each size of files included in a session, each file size having been written in file system information recorded at the head of each track of the session, and selects the session if the added-up size is larger than the size of the new data.

4. The method set forth in claim 1, wherein said step (d) replaces the temporary management information about tracks having been included in the overwritten session with temporary management information about the new track, and moves the temporary management information about tracks in next sessions following the overwritten session to a location right after the temporary management information about the new track.

5. The method set forth in claim 4, wherein each track index number written in the moved temporary management information is changed appropriately to its track order.

6. The method set forth in claim 1, wherein said step (c) conducts the overwriting operation after confirming an overwriting request from a user.

7. The method set forth in claim 1, wherein said step (c) conducts the overwriting operation for a session selected by a user if the number of the sessions discovered in said step (b) is equal to or greater than two.

8. The method set forth in claim 1, wherein said step (b) provides a user with file information on all files included in a session, if discovered, whose size is larger than the size of the new data.

9. The method set forth in claim 1, further comprising updating lead-in information of the overwritten session with information about the new track.

10. A method of overwriting data in a multi-session disk, comprising:
    (a) checking the size of new data requested to be written;
    (b) searching the multi-session disk for a plurality of consecutive sessions whose total size is larger than the size of the new data;
    (c) overwriting the consecutive sessions discovered in said step (b) with the new data; and
    (d) updating temporary management information for tracks recorded in the multi-session disk to reflect the overwritten sessions in the temporary management information, wherein said step (c) pads a remaining area not overwritten in the consecutive sessions with null data.

11. The method set forth in claim 10, wherein said step (b) adds up each size of tracks included in the consecutive sessions, and selects the consecutive sessions if the added-up size is larger than the size of the new data.

12. The method set forth in claim 10, wherein said step (b) adds up each size of files included in the consecutive sessions, each file size having been written in file system information recorded at the head of each track belonging to the consecutive sessions, and selects the consecutive sessions if the added-up size is larger than the size of the new data.

13. A method of overwriting data in a multi-session disk, comprising:
    determining a size of new data to be written onto the disk;
    determining if a plurality of consecutive sessions on the disk have a file size or track size that is larger than the size of the new data;
    selecting and overwriting the consecutive sessions on the disk with the new data if it is determined the sessions have the file size or track size that is larger than the size of the new data; and
    updating temporary management information for tracks recorded in the multi-session disk to reflect the overwritten sessions in the temporary management information.

14. The method set forth in claim 13, further comprising:
    padding a remaining area not overwritten in selected sessions with null data.

15. The method set forth in claim 13, wherein if the selected sessions are determined to include two or more sessions that have a file size or track size that is larger than the size of the new data, the method further includes prompting a user to select one session from the two or more sessions to be overwritten with the new data.

16. The method set forth in claim 13, further comprising:
    providing a user with file information about the selected sessions determined to have a file size or track size that is larger than the size of the new data, before overwriting the selected sessions with the new data.

17. A disk drive, comprising:
    a rotating mechanism configured to rotate a multi-session disk to be inserted into the disk drive;
    an optical pickup configured to read and write data to and from the disk;
    a reproduced signal processor configured to reproduce signals read from the optical pickup into digital signals;
    a recording signal processor configured to record data onto the disk; and
    a control processor configured to determine a size of new data to be written onto the disk, to determine if at least one session on the disk has a file size or track size that is larger than the size of the new data, and to overwrite the at least one session on the disk with the new data if it is determined the at least one session has the file size or track size that is larger than the size of the new data.

18. The disk drive set forth in claim 17, wherein the control processor is further configured to control the rotating mechanism, the optical pickup, the reproduced signal processor and the recording signal processor.

19. The disk drive set forth in claim 17, wherein the at least one session comprises a plurality of consecutive sessions having a cumulative file size or track size that is larger than that of the new data.

20. The disk drive set forth in claim 17, wherein the at least one session exists between two neighboring sessions.

21. The disk drive set forth in claim 17, wherein the control processor updates temporary management information recorded in the disk to reflect the overwritten at least one session.

22. The disk drive set forth in claim 17, wherein the control processor pads a remaining area not overwritten in the at least one session with null data.

23. The disk drive set forth in claim 17, wherein if the control processor determines the at least session includes two or more sessions that have a file size or track size that is larger than the size of the new data, the control processor prompts a user to select one session from the two or more sessions to be overwritten with the new data.

24. The disk drive set forth in claim 17, wherein the control processor provides a user with file information about the at least session determined to have a file size or track size that is larger than the size of the new data, before overwriting the at least session with the new data.

* * * * *